Figure 1:
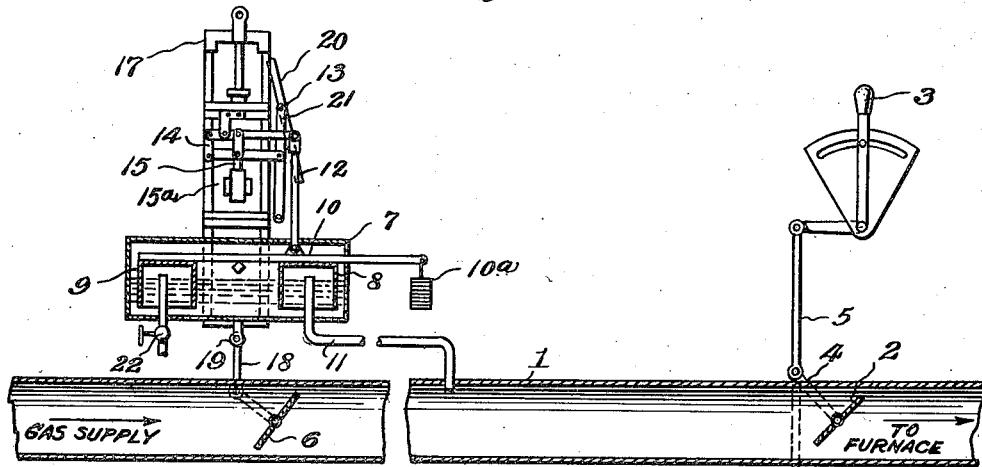
Figure 1:
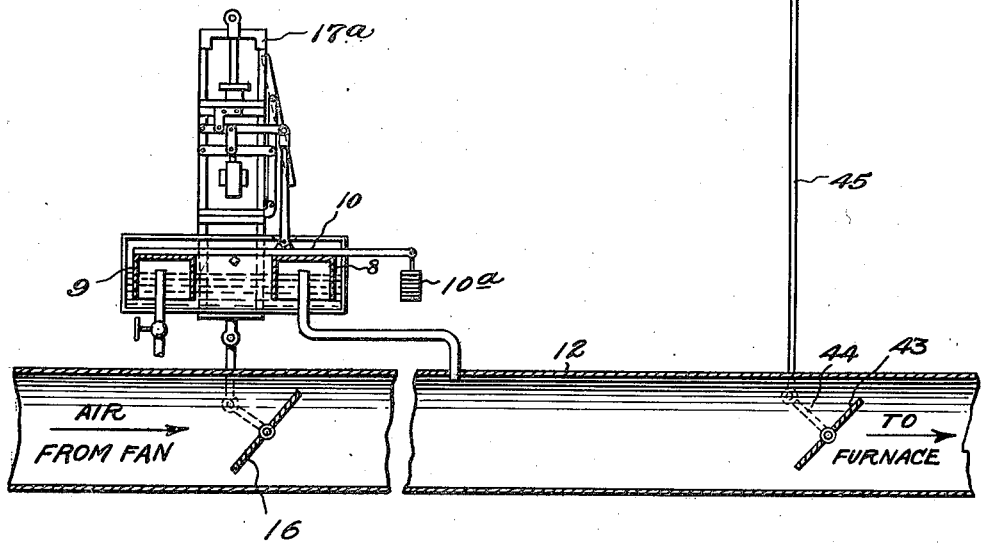

March 27, 1928.

T. A. PEEBLES 1,664,318

FUEL SUPPLY SYSTEM

Filed April 15, 1925

2 Sheets-Sheet 1

Inventor:
Thomas A. Peebles
By: Green & McCallister
His Attorneys

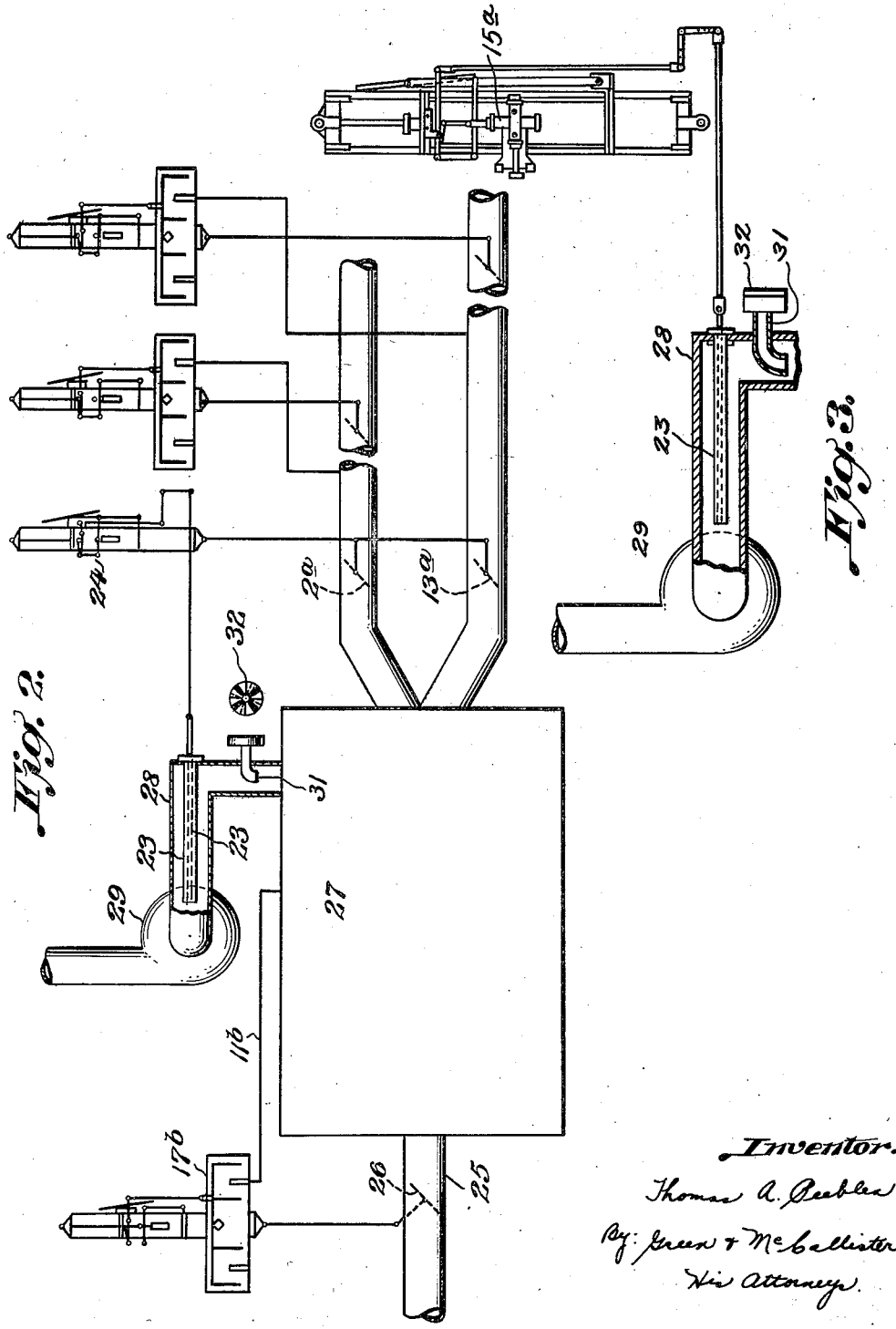

Patented Mar. 27, 1928.

1,664,318

UNITED STATES PATENT OFFICE.

THOMAS A. PEEBLES, OF PITTSBURGH, PENNSYLVANIA, ASSIGNOR TO JOHN M. HOPWOOD, OF DORMONT, PENNSYLVANIA.

FUEL-SUPPLY SYSTEM.

Application filed April 15, 1925. Serial No. 23,397.

This invention relates to a system for supplying gaseous fuel to furnaces or like devices.

Gas-fired furnaces are usually provided with burners in which the gaseous fuel is mixed with the air for supporting combustion. The rate of firing is ordinarily controlled by means of one or more manually adjustable valves, but it will be apparent that the rate at which the combustible mixture is delivered to the furnace will vary independently of the setting of the hand-controlled valves if variations in the pressure of the one or the other of the fluids, constituting the mixture, occur. It will, therefore, be apparent that, in order to obtain uniform firing, it is essential to maintain the pressure of the fluids, constituting the mixture, substantially constant; otherwise, the rate of flow of these fluids will vary and will necessitate constant observation and adjustment of the manually-controlled valve or valves. It will also be apparent that the proportions of air and fuel constituting the mixture must be maintained constant in order to obtain uniform conditions within the furnace and, as a matter of fact, in order to maintain high efficiency of the furnace as a heating unit.

One of the objects of my invention is to produce a system of fuel supply in which means are provided for separately maintaining the pressures of the fluids constituting the combustible mixture substantially constant so that the rate of delivery may be fixed and controlled by the simple setting of a manually-operated valve or valves.

A further object is to produce a system of fuel supply in which means are employed for separately maintaining a constant pressure of the fluids constituting the combustible mixture and for simultaneously varying the delivery of such fluids while maintaining substantially constant the relative proportions of the fluids delivered.

A further object is to produce a system of fuel supply for furnaces or like devices in which automatic means are provided for maintaining a substantially constant pressure in both the fuel and the air conduits leading to the furnace so as to insure a proper proportioning of the fuel and air independently of the rate of flow through the conduits.

A further object is to produce new and improved means for automatically controlling the delivery of components of the combustible mixture to the furnace, in accordance with variations of temperature within the furnace.

A further object is to maintain a substantially uniform pressure of gases in the furnace at all rates of operations, and also to control the delivery of combustible mixture to the furnace in accordance with temperature variations in the furnace.

These and other objects are attained by means of apparatus embodying the features herein described and illustrated in the drawings accompanying and forming a part hereof.

In the drawings accompanying and forming a part hereof, Figure 1 is a diagrammatic view, illustrating the invention as applied to a fuel delivery system in which manual means are employed for regulating the amount of combustible mixture delivered to the furnace; Fig. 2 is a diagrammatic view of a furnace equipped with a further development of the apparatus illustrated in Fig. 1; and Fig. 3 is a diagrammatic view on an enlarged scale of a portion of the apparatus shown in Fig. 2.

I have shown my invention as applied to a fuel system having a conduit 1 for conveying gas from any desired source of supply to the mixing chamber of a burner. The rate of flow of the gas is controlled by means of a valve 2 located in the conduit ahead of the burner (not shown). The valve is manually adjusted by any desired means such, for example, as a hand lever 3 shown in the form of a bell-crank having one arm thereof connected to a valve lever 4 by means of a link 5.

The inlet port of the burner having fixed dimensions, the adjustment of the valve 2 will govern the supply of gas and the rate of combustion in the furnace as long as the pressure in the conduit communicating with the burner remains substantially constant.

In actual practice, however, the source of gas supply is subject to large and sudden variations in pressure and it is, therefore, necessary to provide a device for maintaining the pressure of the gas in the conduit 1 ahead of the valve 2 constant.

This is preferably accomplished by means of an automatically regulated valve 6 which is positioned in the gas conduit some distance ahead of the hand regulated valve 2. The location of the valve 6, with relation to the valve 2, is preferably such that the intervening portion of the conduit has sufficient volume to in effect constitute a receiver. Suitable automatic control mechanism is employed for automatically controlling the valve 6 in accordance with the pressure of the gas in the conduit at a point between the valves 2 and 6.

I preferably provide a valve control mechanism of the type described and shown in Letters Patent No. 1,338,923, dated May 4, 1920. Briefly, this device includes a receptacle 7 partially filled with liquid, into which inverted cups 8 and 9 project. The cups are secured to opposite ends of a lever 10, which is pivoted at its center and is preferably provided with an adjustable counterbalancing weight 10ª. The interior of the cup 8 above the level of the liquid, communicates with the gas conduit 1 by means of piping 11. Variations in the gas pressure within the conduit are transmitted to the interior of the inverted cup 8 by this piping and, consequently, occasion a swinging of the lever 10 about its supporting pivot.

The movements of lever 10 are communicated through connecting rod 12, pivoted lever 13 and bell crank 14 to the pilot valve 15 which admits motive fluid to the cylinder 15ª thereby causing movement of a cross-head 17, which is attached to valve 6 by means of lever 18 and connecting rod 19. In order to prevent overtravel of the cross-head 17 and a resultant hunting of the apparatus, it is necessary that the pilot valve 15 be returned to its closed position by the movement of cross-head 17. This is accomplished by the action of compensator bar 20 acting on the pilot valve through link 21 and bell-crank 14.

These parts are so arranged that a movement of the cross-head in a given direction moves the pilot valve in the opposite direction to that necessary to produce the initial movement of the cross-head. For example, an upward movement of the connecting rod 12 moves the pilot valve in a downward direction and causes cross-head 17 to move upwardly, and upward movement of the cross-head in turn produces an upward movement of the pilot valve 15 to bring it back to its original position. This actuating mechanism is more fully described and set forth in the above-noted patent.

If the gas pressure in the conduit rises above the desired point, the valve 6 is automatically moved until the desired pressure is obtained. Should the valve 2 be opened suddenly so as to increase combustion in the furnace, and the pressure of the gas in the conduit drop as a consequence thereof, the valve 6 will be automatically opened until the desired pressure is again attained.

The pipe connection to the interior of the cup 9 terminates in a valve 22, which may be adjusted to cause the cup 9 to act as a dash pot, in preventing a too rapid movement and an overtravel of the mechanism in response to rapid variations in pressure. The adjustable counterbalancing weight 10ª is employed for the purpose of adjusting the normal pressure within the conduit 1, which is to be maintained substantially constant by the automatic control mechanism. If the weight 10ª is increased the adjusted pressure within the conduit 1 will be increased, and vice versa a decrease in the counterbalancing weight, will decrease the normal adjusted fluid pressure within the conduit. The mechanism may therefore be readily and easily adjusted for different qualities of fuels and thereby avoid the necessity of varying the relative settings of the valves 2 and 13.

An air conduit 12 is provided for conveying air from any desired source, such as a fan (not shown), to the mixing chamber of the burner, where it is mixed with the gas for the purposes of combustion. When the rate of flow of gas through the conduit 1 to the burner is varied it is, of course, necessary to correspondingly vary the rate of flow of air through the conduit 12 to the burner, in order that the proper proportions of gas and air will always be supplied to the burner. The rate of flow of air through the conduit 12 is governed by a suitable, manually operated valve 43, and in order to vary the rates of flow of both gas and air without affecting the proportions of the two fluids delivered to the burner, I connect the operating lever 44 of the valve 43 with the link 5 and operating handle of the gas valve 4 by a second link 45 so that actuation of the single valve operating lever 3 will simultaneously vary the rate of flow of gas and air without changing the proportions thereof which are delivered to the burner.

It is, of course, essential to maintain the air pressure in the conduit 12 substantially constant so that the rate of flow of air through the conduit will be controlled entirely by the valve 43. This is accomplished by means of a valve 16 which is automatically controlled by a mechanism 17ª responsive to variations in pressure of the air in the conduit 12, and which is similar in all respects to the mechanism for controlling the valve 6.

It will be obvious that combustion in the furnace can be varied at will by a suitable manipulation of the single control lever 3 which operates both the gas inlet valve 2 and the air inlet valve 43 so as to simultaneously reduce or increase the amount of gas and air fed to the burner without varying the proportions thereof. In order to accomplish this, it is necessary to maintain the pressures both of the gas in the gas conduit and of the air in the air conduit substantially constant. This is accomplished by provision of the automatically controlled valves 6 and 16 which are operated by the pressure-responsive devices described, so that the pressures of the fluids in their respective conduits are substantially constant regardless of the pressures in the sources of supply or of the rates of flow through the conduits.

Under some conditions of operation, it is desirable to maintain a substantially constant temperature within the chamber to be heated and, for this purpose, I have disclosed means for automatically controlling the delivery of gas and air to the furnace. This feature of my invention is diagrammatically illustrated in Figs. 2 and 3.

In Fig. 2, I have disclosed apparatus in some respects similar to the apparatus illustrated in Fig. 1 except that I have provided automatic means for controlling the valves $2^a$ and $13^a$, which correspond to the manually controlled valves 2 and 13 of Fig. 1, in response to temperature variations. This is accomplished by means of a thermostatic element 23 through the agency of a combined motion multiplying device and relay 24 which actuate the valves $2^a$ and $13^a$.

In view of the fact that the temperature conditions ordinarily encountered in connection with such furnaces are higher than can practically be employed in connection with simple and ordinary forms of thermostatic elements, I have provided means for modifying the temperature, to which the thermostatic element is subjected, but under such conditions that the thermostatic element will in effect act in accordance with variations of temperature in the heating chamber.

In order to accomplish this and also for the purpose of more accurately controlling the rate of flow of the components of combustible mixture to the furnace, I have provided means for maintaining a substantially constant pressure within the combustion chamber or heating chamber 27 of the furnace. As illustrated, the heating chamber communicates with a stack or vent 25 for discharging consumed gases from the heating chamber, and this vent is provided with a damper 26. The damper is controlled by means of the pressure within the chamber 27 of the furnace through the agency of a mechanism $17^b$ which is similar in details of construction to the automatic mechanisms described in connection with the valves 6 and 16 of Fig. 1. With such an arrangement of apparatus, the damper 26 moves to either increase or decrease the effective area of the stack in accordance with pressure variations in the chamber 27, it being noted that the piping $11^b$ communicates with the chamber 27. Under such conditions, a slight increase in pressure within the chamber 27 will occasion an opening movement of the damper 27, and vice versa, a decrease in pressure within that chamber will occasion a closing movement of the damper and the pressure within the chamber will be maintained substantially constant during the operation of the furnace.

The thermostatic element 23 may consist of any of the well-known bimetallic expansion elements but as shown is located in a bypass 28, which communicates at its inlet end with the chamber 27. In order to insure a flow of consumed gases from the chamber 27 through the bypass 28, I employ a fan 29 at the outlet end of the bypass which receives consumed gases from the bypass which preferably delivers them direct to the atmosphere. In order to insure a constant rate of flow of consumed gases through the bypass, I necessarily employ a fan, operating at a constant speed, or an equivalent thereof such as a steam jet.

In order to modify or reduce the temperature of the gases traversing the bypass to a safe temperature which will not occasion too rapid depreciation of the thermostatic element, I employ means for introducing a cooling fluid, preferably atmospheric air, into the bypass and at a rate which is always proportional to the rate of flow through the bypass. Under the conditions desired and those assumed, the apparatus illustrated will deliver a substantially constant quantity of atmospheric air to the bypass.

As illustrated, the temperature modifying device consists of a jet 31, which projects into the bypass 28 but which communicates at its inlet end with the atmosphere. The delivery end of this jet is preferably positioned so that the cooling fluid (air) is initially delivered into the bypass in a direction opposite to that of the flow of the consumed gases through the bypass. With this arrangement, I obtain a uniform mixture of cooling fluid (air) and hot gases and, therefore, obtain a uniform reduction in temperature of the entire stream of gases traversing the bypass.

It will, of course, be understood that the capacity of the fan 29 is such, with relation to the flow conditions in and through the bypass, as to maintain a substantial drop in pressure within the bypass or at least a pressure which is a determined amount below atmospheric pressure, so that the fan not only operates to occasion a flow of consumed gases through the bypass, but also operates to induce a flow of air through the jet 31 and into the bypass.

For the purpose of controlling the reduction in temperature within the bypass without the necessity of varying the speed of the fan, I have provided an inlet valve 32 on the inlet end of the jet 31. This valve is shown as of the grid type and the movable element thereof may be calibrated and, consequently, may be set to definite determined positions for the purpose of obtaining a predetermined reduction in temperature of the gases traversing the bypass and surrounding the thermostatic element.

With this arangement, the temperature within the furnace, may be varied by the mere adjustment of the register or valve 32, which will either increase or decrease the amount of cooling fluid delivered to the bypass, and will thereby vary the operation of the thermostatically-controlled valves 2ª and 13ª so as to vary to the desired degree the average temperature within the chamber 27.

While I have described my invention in connection with a gas-fired furnace, it will be apparent that it is applicable to powdered fuel, and also to liquid fuel fired furnaces, and throughout the claims hereof, I have employed the term "fluid fuel" in its broad sense to include either gaseous or liquid fuels, and with the idea that air or other conveying fluid, when permeated or saturated with powdered fuel, is a fluid fuel.

It should also be pointed out that, while I have referred to the damper 26 and its control mechanism 17ᵇ as being employed to maintain a substantially constant pressure in the chamber 27, this apparatus is in fact employed to maintain a substantially definite relation between atmospheric pressure and the pressure within the chamber 27. Atmospheric pressure varies materially from day to day, and if the gas pressure in the chamber 27 were maintained substantially constant, i. e., with respect to absolute zero, there would be a material variation from day to day between the pressure in that chamber and atmospheric pressure. In order to avoid this and to maintain substantially constant relation between atmospheric pressure and the pressure in the chamber 27, the mechanism 17ᵇ has one side connected to the atmosphere, as shown in connection with the inverted cup 9 in Fig. 1, and the mechanism is also counterbalanced, as in Fig. 1, but for the purpose of maintaining a substantially constant relation between the pressure in the chamber 27 and atmospheric pressure.

I claim:

1. In combination with a furnace having a vent for consumed gases, means for delivering fuel to said furnace, a damper for controlling the delivery of consumed gases through said vent, means responsive to pressure within the combustion chamber of said furnace for controlling said damper to maintain a substantially constant pressure of furnace gases within said chamber, a bypass communicating with the combustion chamber of said furnace and having a port therein communicating with the atmosphere, means for maintaining a substantially constant flow of combustion gases from said chamber through said bypass, a thermostat located in said bypass beyond said port, and means controlled by said thermostat for controlling said fuel delivery means.

2. In combination with a furnace having a vent, for consumed gases, means for delivering fuel to said furnace, means responsive to the pressure within the combustion chamber of the furnace for controlling the delivery of consumed gases through said vent to maintain a substantially constant differential between the pressure within the combustion chamber and atmospheric pressure, a bypass communicating with the combustion chamber of said furnace and having a regulable port formed therein in open communication with the atmosphere, a thermostat located within the bypass beyond said port, means communicating with said bypass for occasioning a flow of gases from said combustion chamber and air through said port past said thermostat, and means controlled by said thermostat for controlling said fuel delivery means.

3. In combination with a furnace having a vent for consumed gases, means for delivering fuel to said furnace, means for controlling the delivery of consumed gases through said vent so as to substantially maintain a predetermined relation between atmospheric pressure and the gas pressure within the combustion chamber of the furnace, a bypass communicating with the combustion chamber of the furnace, a thermostat located therein for controlling said fuel delivery means, means communicating with said bypass for maintaining a flow therethrough of gases from said combustion chamber past said thermostat at a rate to substantially maintain a predetermined relation between atmospheric pressure and the pressure therein, and means between said thermostat and the combustion chamber for admitting air from the atmosphere to the interior of the thermostat.

4. In combination with a furnace having a vent for consumed gases, means for delivering air for combustion to the furnace, means for controlling the delivery of consumed gases from the combustion chamber of the furnace through said vent so as to substantially maintain a predetermined relation between atmospheric pressure and the pressure in the combustion chamber of the furnace, a bypass communicating with the combustion chamber, means for maintaining a substantially constant flow of gases from the combustion chamber through the bypass, means for admitting variable quantities of air to the interior of said bypass and in a direction opposed to the direction of gas flow therethrough, and a thermostatic element located in said bypass beyond said last mentioned means for controlling said means for delivering combustion air to the furnace.

5. In combination with a furnace having a vent for consumed gases, means for delivering fuel to the furnace, means for delivering air for combustion to the furnace, means responsive to gas pressure within the combustion chamber of the furnace for controlling the delivery of consumed gases through said vent so as to substantially maintain a predetermined relation between the gas pressure within the combustion chamber and atmospheric pressure, a bypass communicating with the combustion chamber and having a regulable vent formed therein in open communication with the atmosphere, means communicating with said bypass for inducing therethrough a substantially constant flow of gases from the combustion chamber, and a thermostatic element, located within said bypass beyond said vent, for controlling said fuel and said combustion air delivery means.

In testimony whereof, I have hereunto subscribed my name this 11th day of April, 1925.

THOMAS A. PEEBLES.